(12) United States Patent
Sinha et al.

(10) Patent No.: US 7,781,008 B2
(45) Date of Patent: Aug. 24, 2010

(54) SCARIFIED INFUSED DRIED BUOYANT CRANBERRIES AND METHOD FOR MAKING SAME

(75) Inventors: Nirmal K. Sinha, Frankfort, MI (US); Meena Sinha, Frankfort, MI (US); Michael N. Bauman, Battle Creek, MI (US); Chris Willoughby, Battle Creek, MI (US)

(73) Assignees: Kellogg Company, Battle Creek, MI (US); Graceland Fruit, Inc., Frankfort, MI (US)

( * ) Notice: Subject to any disclaimer, the term of this patent is extended or adjusted under 35 U.S.C. 154(b) by 604 days.

(21) Appl. No.: 11/500,243

(22) Filed: Aug. 7, 2006

(65) Prior Publication Data

US 2007/0031553 A1 Feb. 8, 2007

Related U.S. Application Data

(60) Provisional application No. 60/705,917, filed on Aug. 5, 2005.

(51) Int. Cl.
*A23L 1/212* (2006.01)

(52) U.S. Cl. .............. 426/639; 426/325; 426/483; 426/489; 426/524; 426/640

(58) Field of Classification Search .......... 426/325, 426/430, 483, 489, 524, 639, 640
See application file for complete search history.

(56) References Cited

U.S. PATENT DOCUMENTS

| | | | |
|---|---|---|---|
| 2,692,831 A | 10/1954 | Weckel et al. | |
| 2,848,333 A | 8/1958 | Fisher | |
| 2,865,758 A | 12/1958 | Weckel | |
| 3,800,049 A | 3/1974 | Larroche et al. | |
| 3,843,810 A | 10/1974 | Fehmerling | |
| 4,350,711 A | 9/1982 | Kahn et al. | |
| 4,814,190 A | 3/1989 | Ismail | |
| 5,320,861 A * | 6/1994 | Mantius et al. | 426/599 |
| 5,419,251 A | 5/1995 | Mantius et al. | |
| 5,534,280 A * | 7/1996 | Welch | 426/321 |
| 5,690,725 A | 11/1997 | Tucker | |
| 5,718,939 A | 2/1998 | Nugent | |
| 5,747,088 A | 5/1998 | Fletcher | |

(Continued)

FOREIGN PATENT DOCUMENTS

WO WO 97/07684 3/1997

(Continued)

*Primary Examiner*—Helen F Pratt
(74) *Attorney, Agent, or Firm*—Dickinson Wright PLLC

(57) ABSTRACT

Disclosed is a scarified, whole, dried, infused, buoyant cranberry. Further a process for preparing the cranberry is disclosed. The process includes sizing individually quick frozen cranberries by collecting those that pass through a mesh screen with 16 millimeter openings and that are retained on a mesh screen with openings of 9 millimeters. The sized cranberries are then scarified and infused in an infusion solution having a Brix of from 40 to 80 at a temperature of from 29 to 44° C.±5° C. until the cranberries have a Brix of at least about 40. The cranberries are removed from the infusion solution and dried at a temperature of from 73 to 85° C. until they have a water activity level of from 0.25 to 0.6 and a buoyancy of at least 30%.

40 Claims, 1 Drawing Sheet

U.S. PATENT DOCUMENTS

| | | |
|---|---|---|
| 6,159,527 A * | 12/2000 | Wettlaufer ................ 426/639 |
| 6,254,919 B1 | 7/2001 | Phillips |
| 6,387,438 B1 | 5/2002 | Kato |
| 6,440,483 B1 | 8/2002 | Ghaedian et al. |
| 6,880,455 B1 | 4/2005 | Ghaedian et al. |
| 2001/0043981 A1 | 11/2001 | Lewis et al. |
| 2004/0142072 A1 | 7/2004 | Schwarz |
| 2005/0019477 A1 | 1/2005 | Sinha et al. |
| 2005/0064082 A1 * | 3/2005 | Froseth et al. ............ 426/615 |

FOREIGN PATENT DOCUMENTS

WO　　WO 98/03072　　1/1998

\* cited by examiner

SCARIFIED INFUSED DRIED BUOYANT CRANBERRIES AND METHOD FOR MAKING SAME

RELATED APPLICATIONS

This application claims the benefit of U.S. Provisional application No. 60/705,917, filed Aug. 5, 2005.

STATEMENT REGARDING FEDERALLY SPONSORED RESEARCH

NONE

TECHNICAL FIELD

This invention relates generally to formation of infused dried whole fruit and, more particularly, to a method for formation of a dried buoyant infused whole cranberry.

BACKGROUND OF THE INVENTION

North American cranberries (*Vaccinium macrocarpon*) are a fruit that have recently been found to have a number of health benefits such as helping to preventing urinary tract infections. Thus, consumers have been encouraged to include more cranberries, either in the fruit form or in the juice form, in their diet. However, cranberries are one of the most acidic fruits and as such are very unpalatable unless they are sweetened. Cranberries have an outer skin with a thin waxy film, which makes the cranberry impermeable for exchange of sugar solutions. Thus, in the past cranberries have been infused either in the sliced or cut form, for example U.S. Pat. No. 5,320,861. It has been difficult to develop a satisfactory process for infusing whole uncut cranberries. The patent of Kato et al., U.S. Pat. No. 6,387,438, describes a method of preparing a sweetened softened cooked cranberry piece from punctured cranberries. In the described process the cranberries are frozen, punctured using precisely formed and sized needles, placed in an infusion solution having a Brix of from 45 to 65 at a fruit to syrup ratio of 1:1, and heated to temperatures up to boiling for a period of time sufficient to ensure that the sarcocarp, the interior fruit portion, of the cranberry is softened and sweetened while maintaining the outer skin layer intact with no ruptures other than from the puncture process. These cooked cranberries were not dried, instead they were cooled and packaged after the cooking step. In practical terms the resulting product would likely have to be either frozen or canned to be stable. The process of Kato et al. produces a fruit suitable for pie-filling, but unsuitable for many other food forms including ready to eat cereal. The Kato et al. patent does not disclose any method for making the resulting product shelf stable in the environment of, for example, a ready to eat cereal or granola-type bar. The cranberries disclosed in Kato et al. are not dried, are not buoyant, and are not suitable for use in ready to eat cereals and other desirable food products. The product of Kato et al. will find use only in sauces and fresh pie fillings.

It is desirable to develop a method for producing plump whole cranberries that are dried so they will be shelf stable and buoyant so that they will float in liquids such as the milk in a bowl of ready to eat cereal.

SUMMARY OF THE INVENTION

In general terms, this invention provides a scarified, whole, infused, buoyant, and dried cranberry. The present invention also comprises a method of preparing such a cranberry comprising the steps of: preferably sizing individually quick frozen cranberries; scarifying the sized cranberries; infusing the sized cranberries in an infusion solution having a Brix of from 40 to 80 at a temperature of from 29 to 44° C.±5° C. until the cranberries have a Brix of at least 40; removing the infused cranberries from the infusion solution and drying them at a temperature of from 73 to 85° C. until they have a water activity level of from 0.25 to 0.6, a final Brix of 76 to 84, and a buoyancy of at least 30%, more preferably at least 50%, and most preferably at least 60%.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
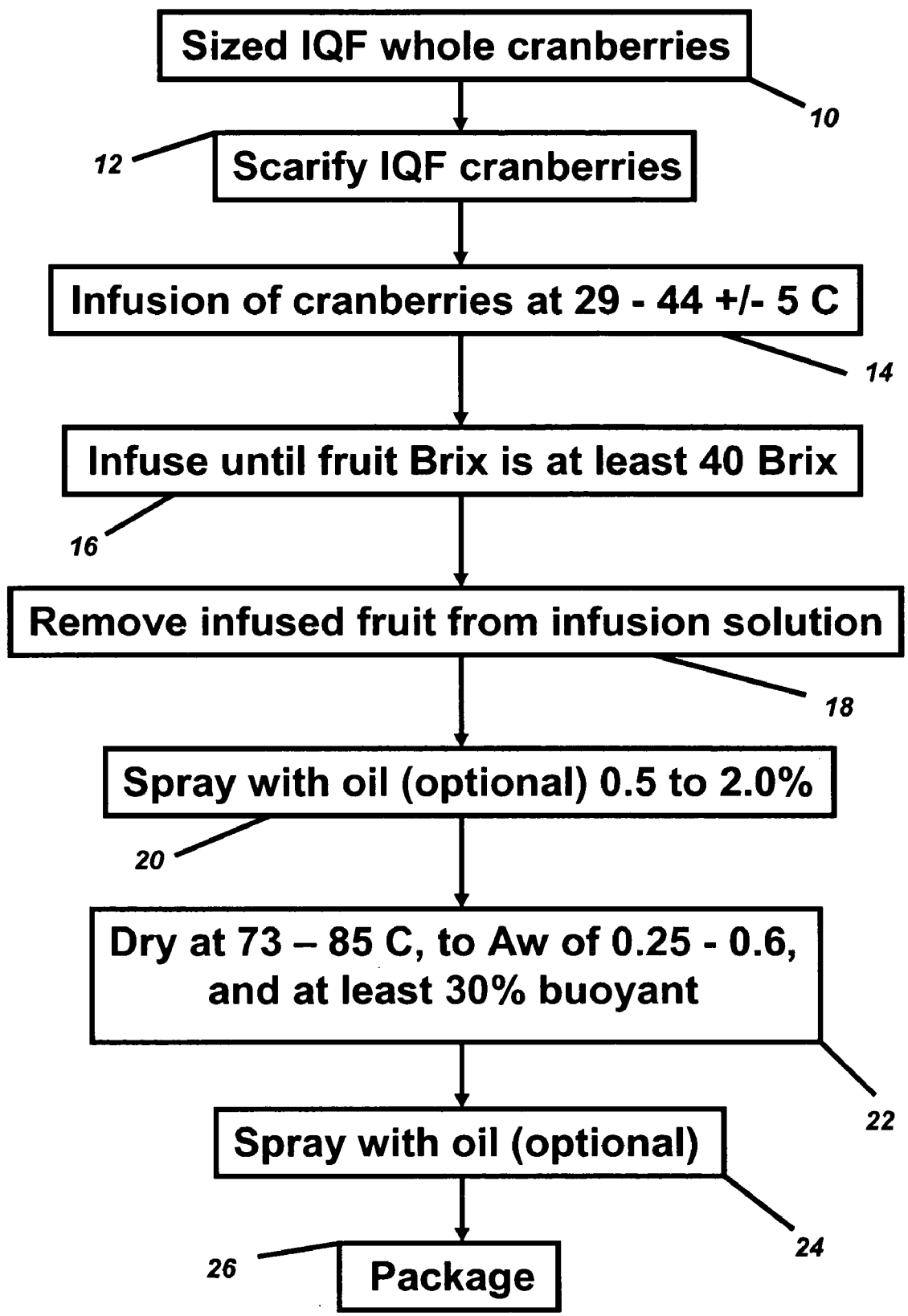
FIG. 1 is a schematic flow chart of a process according to the present invention.

FIG. 1 is a schematic flow chart of a process according to the present invention. In step 10 individually quick frozen (IQF) whole cranberries are preferably sized and color sorted. It is preferable that the cranberries are color sorted to remove those that are not red as expected by consumers. The IQF cranberries are kept at a temperature of from −15 to 0° C. during the sorting and sizing process so that they remain frozen. The IQF cranberries are sized by retaining all those that pass through a mesh screen with 16 millimeter openings and that are retained on a screen with openings of 9 millimeters. The sized whole cranberries are kept frozen and scarified at a temperature of from −15 to 0° C. during the scarification in step 12. Scarification is a process known in the art and uses a feed roller and a roller having the scarification blades. The process is designed to produce minute cuts through the skin of a fruit without cutting or fractionating the fruit. Thus, the skin is left largely intact with a series of cuts in the skin. When the gap between the corrugated feed roll and the scarifying blades is set to 16 millimeters approximately 10% of the IQF sized cranberries were not either nipped or bruised and very few were broken. When the scarification gap is set to 12.7 millimeters approximately 1% of the IQF sized cranberries were not either nipped or bruised and approximately 1% were broken. Thus, for purposes of the present invention the scarification gap is set at a distance of from 16 to 12.7 millimeters. While scarification has been used previously, the cranberries have not been pre-sized and the gap has not generally been adjusted, thus resulting in many broken or split cranberries. In the present specification and claims the term whole cranberry refers to a cranberry that is intact other than the scarification cuts in the skin, it does not mean fractions or pieces of cranberries.

The scarified IQF sized cranberries are then infused at step 14. The still frozen cranberries are placed into infusion solution at a weight ratio of 1:2 to 1:5 of cranberries to solution. The infusion solution is preferably preheated to a temperature of from 29 to 44° C.±5° C. Adding the frozen cranberries temporarily decreases the infusion solution temperature, however the infusion solution is recirculated through a heat exchanger and kept at a temperature of from 29 to 44° C.±5° C. during the infusion. The infusion solution can have a Brix of from 40 to 80, preferably the infusion solution has a Brix of from 65 to 77. Given the ratio of infusion solution to cranberries this enables one to achieve a preferred infused cranberry Brix of at least about 40, more preferably at least 45, most preferably at least 50 Brix. The infusion solution can comprise one or more of any of the known natural or artificial sweeteners. By way of example only, the natural sweeteners include: honey, fructose, sucrose, glucose, maltose, dextrose, corn syrup, high fructose corn syrup, sugar, xylose, ribulose, mannose, galactose, invert sugar, corn syrup solids, fruit juice concentrate, D-tagatose, sorbitol, mannitol, xylitol, galactitol, maltitol, isomalt, maltodextrins, lycasin, and mixtures thereof. Useful artificial sweeteners include by way of example: aspartame, saccharine, sucralose and mixtures thereof. The infusion can also be carried out using fruit juice solutions known in the art such as cranberry infusion solution, pineapple juice, peach juice and other juice solutions. These fruit juices can be treated with added sweeteners to bring their Brix to the desired range of 40 to 80 as detailed above. Other additives that can be included are soluble fiber sources such as inulin and insoluble fiber sources. Another desirable additive is glycerin. Glycerin aids in maintaining the softness of the dried fruit over storage especially when in a ready to eat cereal. Other additives to the infusion solution can include vitamins, minerals, anti-oxidants and preservatives as known in the art. In an embodiment, the infusion is carried out with a solution of 42% to 55% fructose high fructose corn syrup and glycerin. The glycerin is preferably at a level of from 15 to 35% by weight based on the weight of the fruit in the infusion solution. This will result in a final fruit product containing from 5 to 15% by weight glycerin and more preferably from 10 to 15% glycerin. To enhance the fruit firmness one can also add calcium, calcium salts, potassium, potassium salts, or mixtures thereof at a level of up to 0.5% based on the weight of the fruit. To enhance and maintain the red color of the cranberries it is preferable to include ascorbic acid in the infusion solution. Preferably, the ascorbic acid is present in an amount of from 0.5 to 2.5% by weight, more preferably at 1.5% by weight based on the weight of the cranberries. As discussed above, and shown at step 16, the infusion is continued until the cranberries have a Brix of at least about 40, more preferably 45, most preferably at least 50. The infusion can either be done in a batch infusion tank with recirculation of the infusion solution or in a continuous process. Both processes are known in the art. In the continuous process it is possible to use stepped infusion wherein one increases the Brix of the infusion solution during infusion so as to prevent osmotic shock to the fruit cell walls. The desired fruit Brix end point is the same for either infusion process. Using scarified sized cranberries this may require from 1 to 12 hours depending on the infusion temperature.

The infused cranberries are then removed from the infusion solution, which may be reused if desired, in step 18. It is not necessary to wash the infused cranberries, however if desired they can be washed. An additional optional step 20 is to apply oil to the cranberries prior to drying them. This can be helpful in handling and packaging of the final product. The oil can be applied in the form of a misting spray preferably at a level of from 0.5 to 5.0% by weight, more preferably to 1 to 3% by weight based on the weight of the fruit. Any edible oil can be used such as vegetable oils, marine oils that are high in polyunsaturated fatty acids, and other edible oils. The marine oil can be sourced from marine organisms such as fish or it can be produced by algal organisms. It can be helpful to use a stable oil such as, by way of example, mid or high oleic sunflower oil, olive oil, mid or high oleic canola oil, low linolenic soybean oil, coconut oil, partially hydrogenated oils, corn oil, palm oil, palm kernel oil, or mixtures thereof.

In step 22 the infused cranberries are dried. The drying parameters are important for maintaining the plump whole shape of the cranberries and to prevent wrinkling of the cranberry as it dries. Preferably the cranberries are dried at a temperature of from 73 to 85° C. to a water activity (Aw) level of from 0.25 to 0.60 and a moisture level of from 8 to 15 and more preferably to from 10 to 13% by weight. The drying is preferably via forced air and may include a plurality of stages wherein the cranberries are first dried at a first temperature within the range given above for a first period of time and then mixed and dried at different temperature within the range for a second period of time. Generally the total drying time is from 3 to 10 hours. Other drying methods can be used such as microwave hot air drying, vacuum drying, or freeze drying. Generally the dried infused whole cranberries have a bulk density of from 0.4 to 0.6 grams per cubic centimeter. Most importantly, over 30% of the cranberries are buoyant in liquids such as milk. This has not previously been achievable. A typical fresh picked cranberry will float in water, however typical cranberry pieces that have been infused and dried will sink. The buoyancy was a completely unexpected result of the process and opens new possibilities especially in the ready to eat cereal market.

In step 24 the dried cranberries can optionally be sprayed with oil as described for step 20, which is also optional. Then the cranberries are packaged in step 26. The resultant product can be readily incorporated into ready to eat cereals and given its low Aw it is shelf stable for long periods of time.

In a first example, shown in Table 1 below, IQF whole cranberries were sized by passing them through a mesh screen with 16 millimeter openings and keeping those that are retained on a screen with openings of 9 millimeters. The sized whole cranberries are kept frozen and a portion was scarified at a temperature of from −15 to 0° C. The scarification gap was set to from 16 millimeters to 12.7 millimeters. Then 453.6 grams of the unscarified and 453.6 grams of the scarified cranberries were each mixed with 1360.8 grams of 55% fructose high fructose corn syrup (HFCS) containing 6.8 grams of ascorbic acid, 1.5% by weight based on the weight of the fruit. The unscarified sample was infused at 37.8° C. for 11 hours and the scarified for 8 hours. As can be seen from the data the unscarified cranberries had a very low Brix after infusion of only 15.1, whereas the scarified cranberries had a Brix of 38.9. Then each sample was dried at 73.9° C. for 6 hours to a water activity of from 0.34 to 0.48. The final Brix of the unscarified cranberries was 62.4 while that of the scarified cranberries was 81.6. The scarified cranberries had a much higher bulk density than that of the unscarified and their taste and quality was also much better. Most surprising was the buoyancy. The scarified cranberries prepared as per the present invention were 50% buoyant meaning 5 out of 10 floated on milk or water, whereas none of the unscarified cranberries were buoyant. This result was unexpected and unanticipated.

TABLE 1

|  | Unscarified | Scarified |
| --- | --- | --- |
| I. Fruit initial data |  |  |
| Size/form | Whole | Whole |
| Initial fruit Brix | 8.5 | 8.5 |
| Weight of cranberries used (grams) | 453.6 | 453.6 |
| II. Infusion data |  |  |
| Weight of HFCS used (grams) | 1360.8 | 1360.8 |
| Ascorbic acid (grams) | 6.8 | 6.8 |

TABLE 1-continued

|  | Unscarified | Scarified |
|---|---|---|
| Infusion temp (C) | 37.8 | 37.8 |
| Infusion time (hr) | 11 | 8 |
| Infused fruit Brix | 15.1 | 38.9 |
| III. Dried data |  |  |
| Drying Temp (C) | 73.9 | 73.9 |
| Drying time (hr) | 6 | 6 |
| % Moisture | 8.6 | 11 |
| Aw | 0.349 | 0.489 |
| Brix | 62.4 | 81.6 |
| Bulk density | 0.188 | 0.528 |
| Quality | Very tart/hard | Good/soft |
| Buoyancy | 0% | 50% |

In a second experiment, the present protocol was followed using IQF sized cranberries that were cut in half after sizing and prior to infusion. These were not scarified, the cutting making this unnecessary. The purpose was to determine if the infusion/drying process was sufficient to produce buoyant cranberries or if it was necessary to begin with whole cranberries as per the protocol. The halved cranberries were infused with HFCS as above having a Brix of 77 and 1.5% by weight ascorbic acid based on the fruit weight in a fruit to infusion solution weight ratio of 1:3. The infusion temperature was maintained at from 37.8 to 48.9° C. for 6 hours. The infused fruit had a post infusion Brix of 40. The infused cranberry halves were dried at 73.9° C. for 2.5 hours to a Aw level of 0.464. Surprisingly, the buoyancy of the pieces was zero meaning none were buoyant. Thus, it seems necessary to use whole cranberries in order to develop a buoyant final product.

In a third experiment the process of Kato et al. was followed for the infusion step to determine if it results in buoyant products. Whole IQF cranberries were sized and scarified as described above in example 1. They were then mixed with HFCS having a Brix of 65 as specified in Kato et al. at a weight ratio of 1:1 fruit to infusion syrup. The initial infusion syrup temperature was 48.9° C. The infusion solution and cranberries were heated to 65° C. over 10-15 minutes and then to near boiling at 90.5° C. Then the solution and cranberries were cooled to 29.4° C. Total infusion time was 30 minutes. The infused cranberries had a Brix of 37.0 and were dried at 73.9° C. for 7 hours and 20 minutes to a Aw level of 0.391 and a final Brix of 68.4. The dried cranberries were hard and leathery with an acidic taste and hard texture. None of the dried cranberries were buoyant. It is theorized that the high infusion temperatures disclosed in Kato et al. are responsible for the lack of buoyancy in the final product.

The whole dried infused and buoyant cranberries of the present invention are expected to find many uses in consumer products ranging from ready to eat cereals to trail mixes, granola and nutrition bars and as a stand alone snacking product. It has been found that inclusion of glycerin in the infusion solution helps the buoyant cranberries to remain soft over storage in ready to eat cereals and in other food forms. It has also been found that once the cranberries have been dried and prepared as per the present invention the cranberries can be diced or cut and they still remain buoyant unlike cranberries that are diced initially and then processed per the invention.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of preparing a whole, intact, buoyant, dried cranberry comprising the steps of:
    a) scarifying frozen whole intact cranberries using a scarifying gap of from 16 to 12.7 millimeters;
    b) providing an infusion solution having a Brix of from 40 to 80 at a temperature of from 29 to 44° C.±5° C. and infusing the intact scarified cranberries in the infusion solution until the cranberries have a Brix of at least 40;
    c) removing the infused cranberries from the infusion solution and drying the infused cranberries until they have a water activity level of from 0.25 to 0.6, a buoyancy of at least 30%, and a bulk density of from 0.4 to 0.6 grams per cubic centimeter.

2. The method as recited in claim 1 further comprising prior to step a) the step of sizing frozen cranberries by keeping cranberries that pass through mesh screen with openings of 16 millimeters and are retained on a mesh screen having openings of 9 millimeters.

3. The method as recited in claim 2 wherein the step of sizing the cranberries is carried out at a temperature of from −15 to 0° C.

4. The method as recited in claim 1 wherein step a) is carried out a temperature of from −15 to 0° C.

5. The method as recited in claim 1 wherein step b) further comprises providing an infusion solution containing from 15 to 35% by weight based on the weight of the cranberries of glycerin.

6. The method as recited in claim 1 wherein step b) further comprises providing an infusion solution containing from 0.5 to 2.5% by weight based on the weight of the cranberries of ascorbic acid.

7. The method as recited in claim 1 wherein step b) comprises providing an infusion solution having a Brix of from 65 to 77.

8. The method as recited in claim 1 wherein step b) comprises providing an infusion solution comprising at least one of a natural sweetener, an artificial sweetener, a fruit juice, or mixtures thereof.

9. The method as recited in claim wherein the infusion of step b) is carried out for a period of time of from 1 to 12 hours.

10. The method as recited in claim 1 wherein in step b) the infusion solution is provided in a weight ratio of cranberries to infusion solution of from 1:2 to 1:5.

11. The method as recited in claim 1 wherein step b) is continued until the cranberries have a Brix of at least 45.

12. The method as recited in claim 1 wherein step b) is continued until the cranberries have a Brix of at least 50.

13. The method as recited in claim 1 wherein step b) is carried out in a continuous infusion process and the infusion solution is a stepped infusion solution of at least two infusion solutions each having a different Brix from each other.

14. The method as recited in claim 1 further comprising after step b) and before step c) the step of washing the infusion solution off of the infused cranberries.

15. The method as recited in claim 1 further comprising after step b) and before drying in step c) the step of applying an edible oil to the infused cranberries at a level of from 0.5 to 5% by weight based on the weight of the cranberries.

16. The method as recited in claim 15 wherein the edible oil is applied at a level of from 1 to 3% by weight.

17. The method as recited in claim 15 comprising applying a vegetable oil, a marine oil, or a mixture thereof to said cranberries.

18. The method as recited in claim 1 wherein step c) comprises drying the cranberries at a temperature of from 73 to 85° C.

19. The method as recited in claim 1 wherein step c) comprises drying the cranberries to a moisture level of from 8 to 15% by weight based on the total weight.

20. The method as recited in claim 19 wherein step e) comprises drying the cranberries to a moisture level of from 10 to 13% by weight based on the total weight.

21. The method as recited in claim 1 wherein step c) comprises drying the cranberries for a period of time of from 3 to 10 hours.

22. The method as recited in claim 1 wherein step c) comprises drying the cranberries with one of forced air, microwave hot air, vacuum drying, freeze drying, or a combination thereof.

23. The method as recited in claim 1 wherein step c) comprises drying the cranberries to a final Brix of from 76 to 84.

24. The method as recited in claim 1 wherein step c) comprises drying the cranberries to a final buoyancy of at least 50%.

25. The method as recited in claim 1 wherein step c) comprises drying the cranberries to a final buoyancy of at least 60%.

26. The method as recited in claim 1 further comprising after step c) the step of applying an edible oil to the cranberries in an amount of from 0.5 to 5% by weight based on the weight of the cranberries.

27. The method as recited in claim 26 comprising applying a vegetable oil, a marine oil, or a mixture thereof to said cranberries.

28. The method as recited in claim 1 further comprising combining the cranberries obtained after step c) with a ready to eat cereal, into a granola-type bar, or into a trail mixture.

29. The method as recited in claim 1 further comprising after step c) the step of dividing the cranberries into a plurality of pieces.

30. The method as recited in claim 29 further comprising combining the cranberry pieces obtained after dividing the cranberries into a plurality of pieces with a ready to eat cereal, into a granola-type bar, or into a trail mixture.

31. A scarified, infused, whole intact dried buoyant cranberry having a Brix of at least 40, a water activity of 0.25 to 0.60 and a bulk density of from 0.4 to 0.6 grams per cubic centimeter.

32. A cranberry as recited in claim 31 wherein said cranberry comprises ascorbic acid.

33. A cranberry as recited in claim 31 wherein said cranberry comprises from 5 to 15% by weight glycerin based in the total weight.

34. A cranberry as recited in claim 31 wherein said cranberry has a Brix of from 76 to 84.

35. A cranberry as recited in claim 31 wherein said cranberry comprises from 0.5 to 5% by weight based on the total weight of an applied edible oil.

36. A cranberry as recited in claim 35 wherein said oil comprises a vegetable oil, a marine oil, or a mixture thereof.

37. A cranberry as recited in claim 31 wherein said cranberry has a moisture level of from 8 to 15% by weight based on the total weight.

38. A cranberry as recited in claim 31 wherein said cranberry has a moisture level of from 10 to 13% by weight based on the total weight.

39. A cranberry as recited in claim 31 in admixture with a ready to eat cereal.

40. A cranberry as recited in claim 31 incorporated into a granola-type bar or a trail mix.

* * * * *